March 21, 1967  D. G. REINERT  3,310,511
HYDRAULIC CEMENT-EPOXY RESIN COMPOSITIONS
Filed Dec. 31, 1962

BINDER COMPOSITION (RESIN COMPONENT)

A. Compressive Strength (actual)
B. Compressive Strength (expected) } N = 1000

C. Tensile Strength (actual)
D. Tensile Strength (expected) } N = 200

INVENTOR.
DONALD G. REINERT
BY Charles A. Mc Clure
ATTORNEY.

3,310,511
HYDRAULIC CEMENT-EPOXY RESIN COMPOSITIONS

Donald G. Reinert, Emmaus, Pa., assignor to The Electric Storage Battery Company, a corporation of New Jersey
Filed Dec. 31, 1962, Ser. No. 248,743
5 Claims. (Cl. 260—29.2)

This invention relates to novel cements, mortars, and products thereof and concerns especially compositions therefor having both organic and inorganic components.

Hydraulic cements include naturally occurring inorganic compositions or minerals (e.g., so-called cement rock or natural cement) and mineral mixtures (e.g., clay and limestone), but man-made Portland cement has displaced them in most uses where high strengths are required. Organic cements, often called adhesives or resins, of both natural and man-made origin are also known; they differ from hydraulic cements in various physical characteristics, sometimes having somewhat greater strengths, especially for the same weight or mass of component material. As might be expected, attempts to combine these inorganic and organic materials have been made, with varying degrees of success, none eminently satisfactory where water is also present.

A primary object of the present invention is provision of novel cements, mortars, and high-strength products thereof.

Another object is provision of such compositions in which the resin component comprises epoxy resin and is polymerizable to a hard set at room temperature and in the presence of water.

A further object is formation of such compositions containing hydraulic cement and adapted to acquire a hard set in the presence of excess water or even under water.

Other objects of this invention, together with means and methods for attaining the various objects, will be apparent from the following description and the accompanying diagrams.

In general, the objects of the present invention are accomplished by providing compositions comprising hydraulic cement and an aqueous dispersion of epoxy resin in intimate admixture and capable of acquiring a set in which both the cement and the resin are hardened.

Hydraulic cements useful according to this invention include, for example, Portland cement, calcium aluminate cement, magnesia and magnesium oxychloride cements, and natural cements and clay-limestone mixtures. Inclusion of other inorganic cementitious ingredients usually will prove acceptable.

Organic resins recommended for use according to this invention consist essentially of epoxy resin compositions, which may be a single such resin with a well defined molecular weight or a mixture of one or more than one resin in two or more ranges of molecular weight. The resin compositions preferably are liquid at room temperature (e.g., 25° C.) and characterized at such temperature by sufficiently low viscosities (e.g., below twenty thousand centipoises) to facilitate dispersion thereof in water.

A suitable epoxy resin is the diglycidyl ether of bisphenol A, normally formed as condensation product of epichlorohydrin and bisphenol A [i.e., bis(4-hydroxyphenyl)dimethyl methane]. Condensation products of epichlorohydrin with other polyhydric alcohols, which may or may not have such symmetry, also can be used, either in monomeric state or at relatively low degrees of polymerization, as suggested. Examples of additional suitable resins are the diglycidyl ether of bisphenol F (i.e., 4,4'-dihydroxybiphenyl) and the allylglycidyl mixed diether of bisphenol A.

A curing agent for the resin is also employed according to this invention. A basic polymerization catalyst or hardener (cross-linking agent) is preferred, such as a polyfunctional primary or secondary amine. Polyfunctional phenols may also be used, as may polysulfides. An example of a satisfactory curing agent is 2,4,6-tridimethyl aminoethyl phenol. Other examples of curing agents for the epoxy resin or resins used according to this invention, as well as of the resins themselves, will come readily to the mind of a person skilled in the art.

Reference to the accompanying diagrams, as well as to the specific examples and further descriptive matter set forth below, will aid in understanding the invention.

Figure 1:
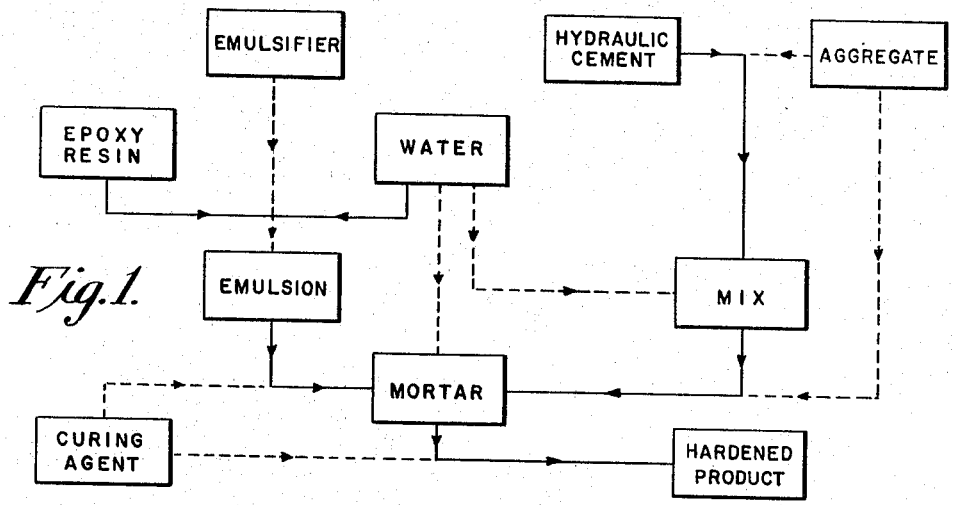
FIG. 1 is a block diagram or flow sheet representing preparation of compositions according to the present invention.

FIG. 1 shows schematically the compositions employed, procedures followed, and compositions resulting at various procedural stages, in the practice of this invention. Broken lines indicate optional or alternative addition of ingredients.

Any dispersing technique that will result in a colloidal (or near-colloidal) suspension of the epoxy resin and water (here usually referred to as "emulsion") may be employed. This may be accomplished by simple agitation or stirring, especially in the presence of an appropriate peptizing or stabilizing agent (here called "emulsifier"), or by more severe measures, such as grinding in a colloid mill or similar device. Normally the weight ratio of water to resin will be somewhat less than unity, and any emulsifier or the like will be present to an even lesser extent.

The hydraulic cement may be mixed with aggregate before being combined with the aqueous emulsion of epoxy resin. The amount (if any), composition, and particle size of aggregate will depend at least in part upon characteristics (e.g., load-bearing capabilities) required in the end-use to which the ultimate hardened product is to be put. Sand, stone screenings, gravel, slag, and cinders are common types of aggregate that may be used. If desired, aggregate may be added after the combining of the cement with the aqueous emulsion of epoxy resin, instead of (or in addition to) beforehand. Such combining can be accomplished simply enough by stirring the so-called "mix" (with or without aggregate present) into the emulsion. The mix usually will be added dry; alternatively, it may have been mixed with water before being combined with the emulsion, particularly where the time intervals involved are short. In either event simple stirring should suffice to mix the respective components homogeneously. Water may be stirred in also.

The curing agent for the epoxy resin is added whenever hardening is desired. Thus, it may be added most conveniently to the emulsion just before or during the combination of the cement or cement-aggregate mix with the emulsion. Alternatively, it may be deferred until after that step, especially where the only water then present is that contained in the emulsion. The cement will begin to hydrate when water is available to it, either from the emulsion or additional water which may be added.

The set product, which also may contain other ingredients not shown or suggested above (e.g., fungicide, fibrous reinforcing agents) and which may be referred to as "concrete-like" for want of any more definitive term (without derogating from its superiority to ordinary concrete), continues to harden over a period of days, weeks, and even months. However, it achieves a high degree of hardness in a relatively short time, probably because of polymerization and cross-linking of the resin, for which no heating is required. Unless otherwise indicated herein, strength figures are expressed in pounds per square inch for the product hardened for one week. Measurements were made on cylindrical specimens: tensile strengths as in ASTM test method C-190-59 for hydraulic cement mortars, and compressive strengths in conventional manner on specimens approximately one inch in diameter and one inch thick.

The above description and the examples set forth below mention weight ratios of some of the components, whether individually or grouped, e.g., binder (cement plus resin and curing agent, all water-free), as convenient composition characterizations. In general, the water-to-cement ratio (which includes the emulsion water) should be within the range of from about one fourth to one half, and the aggregate-to-binder ratio may be anywhere from zero to several-to-one, or even higher, with 2:1 a common value. Selection of the so-called "High Early" type of Portland cement for most formulations was principally for the purpose of expediting test results; in general, regular Portland cement will give comparable eventual strengths.

*Example I*

An aqueous emulsion (Epi-Rez 2051) of diglycidyl ether of bisphenol A, 100 parts (35 parts water), was mixed with 22 parts of a basic curing agent made up of an aliphatic amido amine (Epi-Cure 855) having an equivalent weight of about 90 and a modified aliphatic amine (Epi-Cure 87) having an equivalent weight of about 38 in a weight ratio of 5:4, and with 7 parts of furfuryl alcohol (intended as an accelerator for the curing agent). The resulting liquid was mixed with 520 parts of a dry mix made up of 70 parts of Portland cement of the so-called "High Early" type (ASTM type III, which is high in tricalcium aluminate) and 450 parts of silica sand (1-4% retained on a 20 mesh screen, 75-80% not retained on 20 mesh retained on 40 mesh, 10-25% not retained on either retained on 60 mesh). The resultant was a readily workable mortar that acquired an initial set in about 4 hours. After setting overnight it was harder than a corresponding specimen, used as a control, consisting of cement, sand, and water.

*Example II*

An aqueous emulsion as in the preceding example, 20 parts, was mixed with 4 parts of the same curing agent as in that example. A 2:1 dry mix, 150 parts total, of somewhat finer sand (mesh analysis: 50, 0.70%; 70, 15.1%; 100, 16.0%; 140, 19.4%; 200, 24.1%; 270, 12.7%; finer than 270, 12.0%) and the same cement was also prepared, by rolling the ingredients together. These were combined, together with 20 parts water to give a good quality mortar. Samples were applied to clay briquettes, to old concrete, and between layers of old concrete, all showing good adhesion. When similar specimens were prepared using smaller quantities of sand than 100 parts, the resulting compositions were useful in a bed joint down to 80 parts, and for grouting in the vicinity of 40-50 parts.

*Example III*

Epoxy resin emulsion, 200 parts as in the first example was mixed with 45.5 parts of a curing agent containing the same components as in the first example but in the ratio of 5:2 (instead of 5:4). The resulting liquid was combined with 225 parts of the same cement, 619 parts of the same sand, and 7 parts of water. The resulting mortar was divided into a number of suitable containers for 2 days and then removed for testing and allowed to stand exposed to the atmosphere. Upon removal from the containers the specimens exhibited a tensile strength of 173 p.s.i., and after 6 more days 565 p.s.i.; at the same time intervals the corresponding compressive strengths were 782 p.s.i. and 2626 p.s.i. A corresponding formulation in which the Portland cement was replaced by a calcium aluminate cement (Lumnite) with no other change in composition gave tensile and compressive strengths of 67 p.s.i. and 235 p.s.i. at 2 days, and 282 p.s.i. and 1395 p.s.i. at 7 days, all at room temperature. A concrete control made up of the same sand and Portland cement in a ratio of 2.75:1 plus enough water to make a damp mortar kept moist and covered for 8 days gave tensile and compressive strengths of 327 p.s.i. and 2643 p.s.i. at the end of that time. Certain of the specimens were set in the shape of thin-walled containers 2" x 2" x 4" for filling with various liquids or "chemical exposure media" to determine the extent to which the specimens would deteriorate when so exposed.

The following table indicates the effect of various chemical exposure media, principally as aqueous solutions, upon the weight and compressive strengths of the first formulation of this example and of the mentioned concrete control (denoted "Invention" and "Control," respectively) in such specimens aged 7 days at room temperature (the control specimens also being immersed to wet and dried for 3 days in air before testing) after such exposure for 28 days:

TABLE 1

| Exposure Medium | Invention | | Control | |
|---|---|---|---|---|
| | Weight (percent) | Strength (percent) | Weight (percent) | Strength (percent) |
| Room temp.: | | | | |
| 5% HCl | −0.58 | −47.3 | Disintegrated | |
| 5% $H_2SO_4$ | +9.07 | −33.6 | Disintegrated | |
| Vinegar | +2.05 | −29.8 | +1.84 | −78.5 |
| 2% Lactic acid | +4.09 | −30.0 | +5.00 | −46 to −67 |
| 5% NaOH | +5.05 | −28.2 | +7.28 | −23.70 |
| 5% $NH_4OH$ | +3.46 | −30.0 | +8.13 | −21.20 |
| 5% NaCl | +4.08 | −28.1 | +6.97 | −31.20 |
| Beer | +5.87 | −27.1 | +6.77 | −13.75 |
| No. 2 Fuel Oil [1] | +5.67 | −23.4 | +6.54 | −15.20 |
| 150° F.: | | | | |
| 5% HCl | +3.62 | −67.5 | Disintegrated | |
| 5% $H_2SO_4$ | +26.65 | −67.0 | Disintegrated | |
| Vinegar | +7.06 | −34.2 | −0.48 | −73.30 |
| 2% Lactic acid | +7.47 | −14.4 | +5.25 | −62.70 |
| 5% NaOH | +11.45 | −28.5 | +10.05 | −12.30 |
| 5% NaCl | +8.37 | −21.4 | +8.60 | −19.70 |

[1] 100°-130° F.

The following table indicates the effect of exposure for a like period of 28 days to the same chemical media upon similar specimens prepared using regular Portland cement, instead of the High Early type, and with no other change:

TABLE 2

| Exposure Medium | Invention | | Control | |
|---|---|---|---|---|
| | Weight (percent) | Strength (percent) | Weight (percent) | Strength (percent) |
| Room temp.: | | | | |
| 5% HCl | −.13 to −.22 | −38.4 | Disintegrated | |
| 5% H$_2$SO$_4$ | +11.6 | −33.5 | Disintegrated | |
| Vinegar | +0.91 | −33.9 | +3.7 | −69.0 |
| 2% Lactic acid | +2.46 | −25.7 | +5.3 | −43.0 |
| 5% NaOH | +6.9 | −23.9 | +7.0 | −43.5 |
| 5% NH$_4$OH | +1.7 | −27.6 | +6.9 | −19.4 to −66.7 |
| 5% NaCl | +1.7 | −20.8 | +6.3 | −29.3 to −46.6 |
| Beer | +7.7 | −19.3 | +7.5 | −29.3 |
| No. 2 Fuel Oil [1] | +5.3 | +4.6 | +6.8 | −4.15 to −33.3 |
| 150° F.: | | | | |
| 5% HCl | +4.0 | −43.3 | Disintegrated | |
| 5% H$_2$SO$_4$ | +29.2 | −62.0 | Disintegrated | |
| Vinegar | +4.5 | −15.6 | +1.3 | −69.2 |
| 2% Lactic acid | +5.5 | +13.6 | +4.3 | −20 to −82.2 |
| 5% NaOH | +9.1 | −2.7 | +9.3 | −21 |
| 5% NaCl | +6.0 | +9.25 | +7.1 | −9.9 to −44.7 |

[1] 100°–130° F.

It is apparent from the data in the above tables covering a wide range of exposure that in general the hardened products of this invention take up less liquid and suffer less loss in compressive strength than does ordinary concrete. The indicated superiority extends to exposure to acidic, basic, and neutral media. Thus, not only do the products of this invention attain higher strengths than would be expected, they suffer less strength loss upon exposure to many, probably most, chemical agents deleterious to the strength of ordinary concrete.

*Example IV*

An emulsion was formed by stirring together 60.7 parts of diglycidyl ether of bisphenol A having a viscosity of about 12,000 to 15,000 centipoises, an average molecular weight of 350 to 400, and an epoxide equivalent of 180 to 200 (Epi-Rez) 510, with 16.7 parts water and 22.4 parts of an emulsifier (Syntex 3508 or CX 6152 comprising 25% solids, 75% water), and 0.1 part of phenyl mercuric acetate was added as a fungicide. The resulting emulsion was milky white, had a viscosity of from 400–800 centipoises, a pH of 2–5, and weighed about 9.1 pounds per gallon. It closely resembled the emulsion used in the preceding examples. To 200 parts of this emulsion were added a curing agent made up of 10 parts of a polysulfide liquid polymer, identified as a difunctional mercaptan having a viscosity of 700–1200 centipoises and having an average molecular weight of 1000 made from 98 mol percent of bis(2-chlor-etho formal) and 2 mol percent trichloropropane, and 7.6 parts of 2,4,6-tridimethyl aminomethyl phenol. The same Portland cement, 225 parts, and sand, 619 parts, as in the first example were combined with the liquid by mixing, and the resulting mortar was allowed to set at room temperature for one week. The resulting values of tensile and compressive strength were 715 p.s.i. and 6296 p.s.i. A control made of the same quantities of the same sand and cement with 76.5 parts of water gave corresponding strengths of 203 p.s.i. and 1532 p.s.i. When the resin-to-cement ratio was changed to 1:2, at the same aggregate-to-binder and water-to-cement ratios, the corresponding values were 543 p.s.i. and 5561 p.s.i.; and at 1:20 were 661 p.s.i. and 1944 p.s.i.

Figure 2:
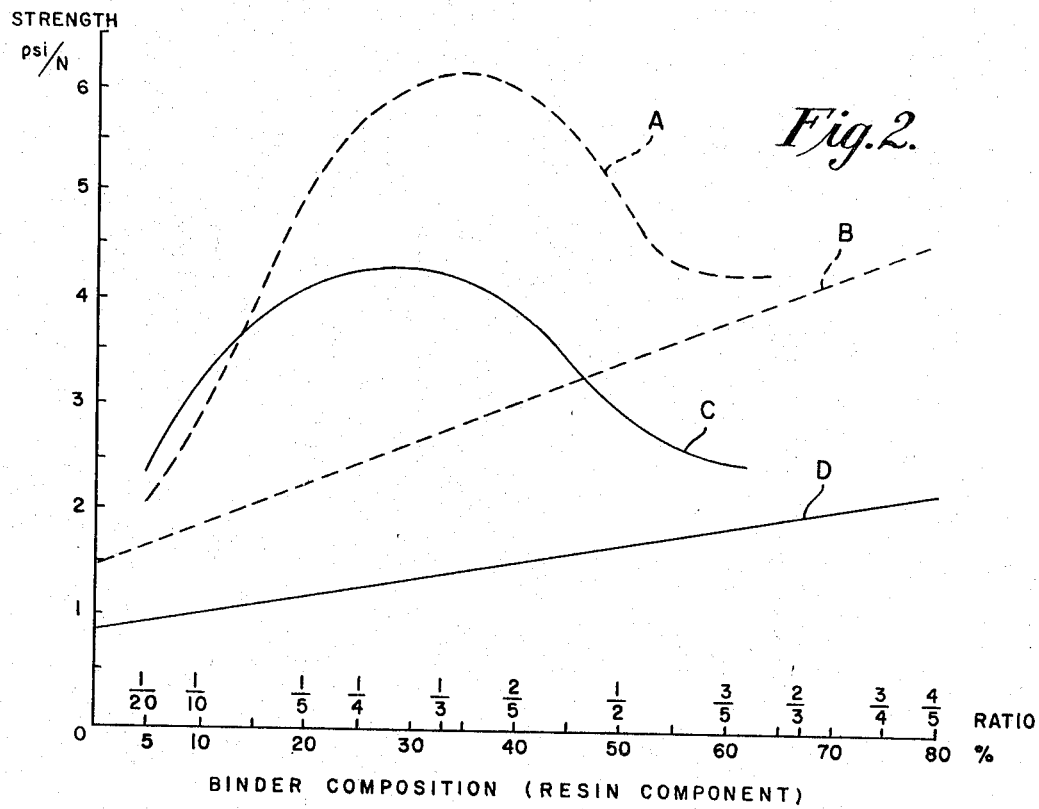
FIG. 2 is a graphical representation of compressive and tensile strengths of the final or hardened product of this invention as functions of the composition.

FIG. 2 shows in graphical form curves of the resulting tensile (A) and compressive (C) strengths of the products of this example versus binder composition (resin component—i.e., resin plus curing agent). The extreme left (0% abscissa) of the graph represents an all-concrete control lacking epoxy resin components, while the extreme right (100% abscissa, not shown) would represent an all-resin (with curing agent) composition lacking hydraulic cement (or aggregate). Included are straight-line values (B and D, respectively) representing the strengths that would be expected if the intermediate compositions had only an averaging effect. Instead, it will be observed that both curves peak at composition ratios of from about ¼ to ⅓, then decline gradually to from about ⅕ to ⅖, then fall rapidly to approach the respective straight lines more or less asymptotically. The curves are discontinued below about 1⁄20 and above about ⅗, as in those extreme ranges the results are no more than negligibly better than what would be expected. For convenience in scaling, the actual values are obtained by multiplying the indicated ordinate value by a factor N: for A and B, N=1000; for C and D, N=200.

The effect of varying the water-to-cement ratio (W/C) in the formulation of Example IV are indicated in the following table; the control is as in the example, with amount of water varied as required:

TABLE 3

| W/C | Invention (p.s.i.) | | Control (p.s.i.) | |
|---|---|---|---|---|
| | Tensile | Compressive | Tensile | Compressive |
| 0.25 | 606 | 6,038 | 269 | 708 |
| 0.30 | 559 | 5,294 | 168 | 753 |
| 0.35 | 545 | 5,731 | 65 | 1,165 |
| 0.40 | 525 | 5,230 | 323 | 2,668 |
| 0.45 | 770 | 5,244 | 345 | 2,515 |
| 0.50 | 740 | 4,353 | 333 | 1,701 |

The strengths of the control at low water-to-cement ratios may be somewhat low because of the much greater difficulty in mixing and compacting the product, a difficulty not encountered with the products of this invention.

Advantages and benefits, notably increased product strengths, attained through the practice of this invention are noted above in some detail. Also observed in the products of this invention is more rapid hardening to increased strengths with confining forms removed and without any other covering or moistening of the surface as is required for best results with concrete as such; the epoxy resin appears to impede loss of moisture from the outer portion of the product to an optimum extent for hydration of the component cement. Furthermore, the presence of water on the surface of the product does not weaken the product as it does concrete, perhaps by virtue of a similar sealing effect attributable to the resin, and—once self-supporting—the product of this invention will proceed to take on a hard set even under water.

As suggested above, the ingredients used in the practice of this invention may be varied in identity and amount or be supplemented by other ingredients without departing from the claimed invention. This invention can be practiced readily by persons having ordinary skill in the The claimed invention:

1. A hydraulic cement-epoxy resin composition comprising hydraulic cement, an epoxy resin which is liquid at room temperature and which can be cured at room temperature, and a non-acidic curing agent for said epoxy resin, said epoxy resin being incorporated into the composition in the form of an aqueous emulsion consisting essentially of water, said epoxy resin and an emulsifier therefor, with said epoxy resin plus curing agent amounting to from about 20 to about 60% by weight of the total amount of binder present in the composition, said binder consisting essentially of hydraulic cement plus epoxy resin and curing agent.

2. A composition in accordance with claim 1 which contains an aggregate filler in an amount of at least about 2 parts by weight of binder.

3. A composition in accordance with claim 1 in which said epoxy resin is a condensation product of epichlorohydrin reacted with a polyhydric alcohol.

4. A composition in accordance with claim 1 in which the nonacidic curing agent is a polyfunctional primary amine, a polyfunctional secondary amine, a polyfunctional phenol or a polysulfide polymer.

5. A composition in accordance with claim 1 in which the nonacidic curing agent is a combination of a polysulfide polymer and a polyfunctional phenol.

References Cited by the Examiner

FOREIGN PATENTS 231,242  3/1925  Great Britain.
217,363  9/1961  Austria.

OTHER REFERENCES

Bakelite "C-8 Epoxy Resins," Bakelite Co., New York, N.Y. (1954).

MURRAY TILLMAN, *Primary Examiner.*

J. C. BLEUTGE, *Assistant Examiner.*